UNITED STATES PATENT OFFICE.

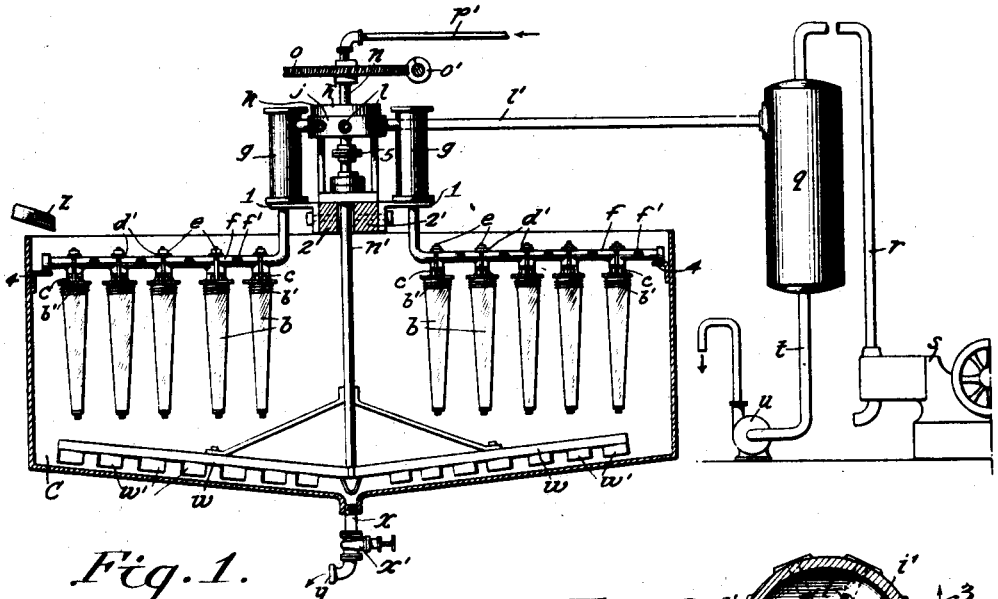

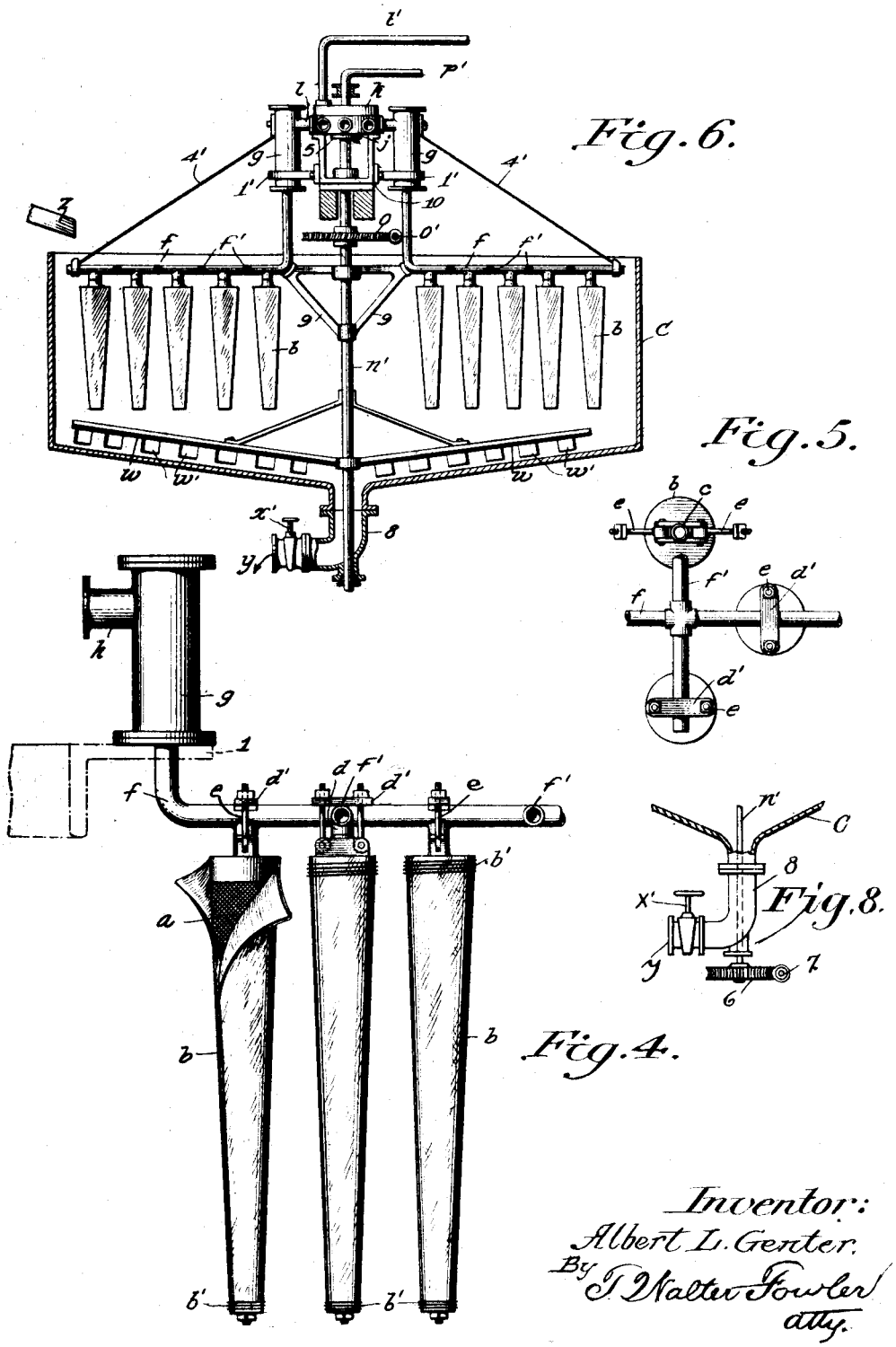

ALBERT LEGRAND GENTER, OF SALT LAKE CITY, UTAH, ASSIGNOR OF ONE-HALF TO GENERAL ENGINEERING COMPANY, OF SALT LAKE CITY, UTAH, A CORPORATION OF UTAH.

CONTINUOUS THICKENING PROCESS.

1,379,095.  Specification of Letters Patent.  Patented May 24, 1921.

Application filed March 3, 1919, Serial No. 280,299. Renewed March 22, 1921. Serial No. 454,414.

*To all whom it may concern:*

Be it known that I, ALBERT L. GENTER, a citizen of the United States, residing at Salt Lake City, in the county of Salt Lake and State of Utah, have invented certain new and useful Improvements in Continuous Thickening Processes, of which the following is a specification.

My invention relates to a new and useful thickening process employing preferably an open tank or container, wherein a series of suction filter elements are submerged, as I will hereinafter describe and claim.

The construction of apparatus I employ in carrying out my process is such that the overflow rim common to decantation tank thickeners is eliminated and the filtrate withdrawn from the elements by a vacuum means on the one hand and a counter current cleansing action is applied to the interior of said elements in such a manner that during the process of filtration, different series of these elements are being cleansed while the balance are filtering in the same tank. The entire process takes place during submergence in the same tank and the sediment discharged from the elements, during submergence by the counter current cleansing action substantially as outlined in my previous Patent No. 1,263,226, dated April 16, 1918, and in a prior application, Serial Number 218,140, filed by me February 19, 1918, jointly with George C. Jones, settles to the bottom of the common container or tank and is removed therefrom by any suitable mechanical means.

In the aforesaid prior patent and prior joint application, means have been shown for cleansing the filter medium during submergence in a pressure chamber by the action of alternately directing in any desired succession the filter current against one side of said medium and a cleansing filtrate current against the opposite side of said medium. Although my present means of cleansing the medium *in situ* is broadly and substantially the same as in the patent and application referred to, attention is called to the fact that my present invention results in a very important improvement on the aforesaid prior inventions, for it permits cleansing one or more filter elements in the common tank while filtration is progressing in a portion or the balance of the elements. Thus a really uninterrupted continuous filtration and thickening of the unfiltered mixture in one tank results. This cleansing of one or more elements while filtering in the balance of the elements in the same tank is impossible in my prior Patent Number 1,263,226, because the positive pressure must be released on all elements in said pressure tank at the time the cleansing action takes place. Hence by employing the pressure process specified in said Patent Number 1,263,226, and said prior application, Serial Number 218,140, a series or battery of pressure tanks must be used to obtain a continuous filtrate flow from a continuous feed. By employing the means hereinafter set forth, however, I can accomplish the cleansing of any desired number of the elements in submergence while the balance are filtering in one and the same reservoir.

I am aware of the fact that continuous vacuum filters exist, which operate in tanks or containers, but I again call attention to the fact that all of these filters remove the filter medium or portions thereof from the unfiltered mixture, during this continuous operation, in order to cleanse the mediums by removing the filter cake made up of solids and moisture. In my present invention, however, the filter medium is kept submerged during the continuous filtration and cleansing of the filter mediums. The elements are removed from submergence only in cases where repairs such as recovering of same with new filter mediums, etc., are necessary.

The present arrangement also aims at doing away with the expensive large decantation tanks and their peripheral overflow for the decanted liquid. In the present instance, I substitute a series of filter elements similar to those described in my said prior patent in place of the peripheral overflow in the common decantation tank and employ a vacuum means for drawing filtrate through the filter elements. Any well known mechanical means for removing the thickened product from the bottom of said tank may be employed. It will thus be apparent that the clear peripheral overflow from decantation tanks will depend in all cases upon the readiness with which the solids in such decantation tanks settle to the bottom and in my present invention this clearness depends upon the filter medium employed and the amount of filtrate depends primarily upon the amount of filter area installed. My process will also produce, when installed in the ordinary decantation tank, a much greater volume of clear liquid as well as a greater quantity of thickened discharge.

In the accompanying drawings forming part of this specification, I illustrate several forms of apparatus by which my process may be carried out. The invention is not, however, restricted to these or to any particular form of apparatus, as it is obvious that I may resort to a variety of mechanical constructions and arrangements of parts, which may produce the results hereinafter referred to.

Figure 1 is a sectional view and part elevation of an entire equipment of elements, tank, discharge mechanism, central distributing valve and vacuum system.

Fig. 2 is the horizontal section on the line 2—2 of Fig. 3, showing the distributing valve for filtrate and counter current cleansing means.

Fig. 3 is a vertical section on the line 3—3 of Fig. 2.

Fig. 4 shows details of several filter elements with filtrate chambers, and associated parts.

Fig. 5 is a plan view of the connection for the filter elements of Fig. 4.

Fig. 6 is a sectional elevation of an alternative means of rotating the elements in the unfiltered mixture as well as rotating the discharge mechanism.

Fig. 7 is a plan view of Fig. 1 with certain of the filter elements omitted and may also be substantially a plan view of Fig. 6.

Fig. 8 is a modification to be referred to.

Referring to the type of apparatus illustrated in Fig. 1, the unfiltered and unthickened material flows into the open tank, C, through the launder or pipe $a$; the continuous feed can be here regulated in any suitable manner. Located in the tank, C, are groups of filter elements, $b$, attached by suitable quick-clamping means, $d'$ $e$, (Fig. 4), to appropriate filtrate pipes $f$ and $f'$. The filter elements are tubular and, preferably, are made of any rigid porous material, $a$, (Fig. 4), and each element has a hollow interior ending in a nipple, $c$, and is incased in a suitable bag or covering $b$ of filter medium, which may be held in place by a cord or other winding, $b'$, which may continue over any desired portion of the bag or covering.

Attached to the top nipple, $c$, of each filter element are proper fastening bolts, $e$, $e$, which clamp a cross bar $d'$ over suitable pipes $f$ or $f'$, and compress the nipples, $d$, which are formed on the pipes $f$ and $f'$, to the nipples, $c$, on the filter elements, thus firmly holding the parts leak-proof in place. The cross filtrate pipes $f'$, and $f$, end in a common pipe or cylinder $g$, the purpose of which cylinder or enlarged pipe being to store a surplus amount of filtrate to be used during the blow back or counter current cleansing action, thus offering sufficient surplus to prevent the other additional pressure means, such as air or steam, from reaching the interior of the filter bags during the counter-current cleansing action. It has been found in practice that sediment will be discharged better from such elements by means of a current of filtrate while the elements are submerged than if compressed air or steam passed through the ports of the filter elements during counter current cleansing action.

Referring to Figs. 1, 3 and 6, it will be seen that the filtrate chambers or cylinders, $g$, are attached to a common filtrate collecting piece or chamber, $j$. There will be as many filtrate chambers, $g$, and connections to the collecting chamber, $j$, as there are nests or groups of filtrate pipes, $f, f'$. This will be varied according to the size of the tank and other elements entering into economical designs of such an apparatus. The filtrate passes from the collecting chamber $g$, to the center collecting piece or chamber, $j$, through the ports, $l$. Rotating with a leak-proof bearing surface against the upper surface of the center piece, $j$, is a distributing housing or timing piece, $k$, having a hub projection, $m$, and a port or passage $i'$. It will thus be apparent that if this upper portion (Figs. 2 and 3) revolves against the companion lower portion, $j$, for instance in a clock-wise direction, that the port, $i'$, will come directly over the upper ends of the ports, $i$, one after another in rotation, thus cutting off these ports from their common connection with the balance of ports, $i$, and the vacuum filtrate outlet, $l$. It will also be noticed that the ported projection, $m$, and port $i'$, rotate past the open vacuum filtrate collecting port, $l$, but do not completely cover the same. The rotation is occasioned by a worm-gear, $o$, and worm, $o'$, which in its turn is driven by any desired mechanical force.

The vacuum collecting port, $l$, in the collecting piece $j$, is connected to a delivery pipe, $l'$, which in Figs. 1, 6 and 7, leads to a suitable vacuum chamber, $q$. The air is exhausted from this vacuum chamber by means of the vacuum pump, $s$, and its pipe line, $r$. The filtrate or filtered liquid flowing into the vacuum chamber, $q$, is removed from the same by means of suitable suction pump, $u$, connected to the chamber by means of pipe line, $t$. From this description it will be seen that when the vacuum pump is properly working, the suction produced will draw liquid through the filter medium, $b$, on elements, a, to the interior of the same, then through the pipes, f and f', into the various filtrate chambers, g, (Fig. 1), thence through ports i to the interior of the revolving housing, k, and out through pipes l and l', to the vacuum tank, q. The amount withdrawn is continually made up by the feed at z through the launder. It will thus be seen that if the housing, k, its projection, m, and air port, i' be revolved during the filtering operation, that one port, i, with its filtrate chamber, g, filter pipes, f and f', and filtering elements attached thereto will be virtually removed from the filtrate system or cut-off, and during this cut-off period the vacuum ceases to exist within the particular system or group of filter elements attached to the chamber, g, while the balance of systems or groups of elements will be filtering. In some instances this releasing of the vacuum to the atmosphere through the ports or passages, i, i' and p' (see Fig. 3), will be sufficient to permit the filtrate in the chamber, g, and in pipes f and f', to rush back through gravity to the interior of the filter elements in question and discharge the same or sediment adhering to the outside of the same automatically. In order to aid this counter-current filtrate action, additional compressed air means may be applied through a proper pipe, p', and stuffing box, p, (Figs. 1 and 3), which permits the air-pipe attached to the revolving shaft, n, to revolve with the said shaft. If such additional counter-current pressure be added, it stands to reason that a shock from the same will be periodically transmitted through the pipes or passages, p', i' and i, to the filtrate contained within the chamber, g, thus resulting in a more thorough cake discharge. The housing, k, with its projection, m, and port i', continues to revolve, thus disconnecting one filtrate port after another and discharging the cakes in the various groups of filter elements one after another until all of the elements in the tank have been cut out one after another, cleansed by counter-current and again brought into the filtrate stage by the projection, m, passing away from the open ends of the various ports, i, which in their turn are connected to the common filtrate chamber in the housing k.

In Figs. 1 and 3, the shaft, n', is shown connected by means of a coupling, 5, to the revolving housing, k, and its shaft, n. The shaft n' in Fig. 1, supports and revolves a suitable scraping mechanism herein shown as comprising radial arms, w, having a series of blades or plows, w' operating near the bottom of the tank C. Thus it will be seen that the power used for revolving the housing, k, and continuously discharging the sediment from the filter elements, may also be used for revolving a plow-scraper which moves the discharged and settled sediment toward the central opening, x, in the large tank, C, and this thick mud or sediment may be drawn from the opening, x, by means of proper valves, x' and y. In order that the filter elements with their filtrate pipes, f', f, and chambers, g, and the filtrate collecting piece, j, and the driving mechanism, o and o', (Fig. 1) may be properly supported within the tank, C, suitable supports 2, 2', are provided and supplied with brackets, 1. The outer ends of filtrate pipes, f, are also supported at 4.

In the arrangement disclosed in Fig. 1, the valve housing, k, shafts, n and n', and scraper mechanism w and w' revolve independent of the balance of the apparatus. I may, however, revolve the plow-mechanism separately from the mechanism that revolves the housing, k. Such an arrangement would result in running the shaft, n', (see Fig. 8), through the bottom of a proper fitting, 8, on the bottom of the tank, C, and providing the shaft with its individual driving mechanism 6 and 7, in which case the shafts, n' and n would be disconnected at 5. (See Fig. 3.) This independent driving of the scraping mechanism, w, and timing or valve-mechanism, k, might be required in instances where the material removed from the tank by the plow or scraping mechanism, w, w' should revolve faster or slower than does the cake discharge timing mechanism, k.

Furthermore, the following construction may be resorted to, if desired. The filter elements, b, with their filtrate pipes, f and f', and filtrate chambers, g may all be rotated in the tank in which case the upper part of the timing mechanism, otherwise called the housing, k, remains stationary with its atmospheric opening, p', or air connection, p'. In this case the vacuum port, l, which is shown in the lower part j, of this mechanism, in Fig. 3, would be transferred to the upper part, k (see Fig. 6), in order that the vacuum line may be held stationary. The lower filtrate collecting piece then revolves together with all filtrate pipes, g and f, f' and filtrate elements, b, and the entire arrangement may be properly supported, as shown in Fig. 6 at l' and with tension rods, 4', and bearings, 10, as well as braces, 9, and associated parts. The worm gear drive may be located in the full-line position shown in Fig. 6, or in the dotted line position shown, or in any other position as long as the elements and plow and scraping mechanism, w, w' are rotated together or the plow and scraping mechanism are rotated at one speed through the gearing, 6 and 7, and the filter elements through the gears shown in full-line position.

There will be a great advantage in rotating the filter elements while filtering some materials, in order to help release the disengaged material from the exterior of said elements at the time the back pressure occurs. This rotation, together with the fact that the filter elements are submerged during this operation will result in a more thorough cleansing of the said elements of very colloidal or slimy materials. Although I have specifically set forth the particulars of various embodiments in the present invention, yet it will be understood that I do not desire to limit myself to the precise construction specified, but shall feel at liberty at all times to modify the construction to any extent within the spirit and scope of the present invention as defined by the appended claims.

It will be seen from the foregoing description that my invention constitutes a decided improvement over the common decantation systems which depend entirely on a large periphery for the amount of clear decanted liquor, and also constitute a direct improvement on my above cited patent and aforesaid Genter-Jones application while making use of the cleansing action used in same. It will also be noted that natural settling can take place in the present invention and that the naturally settled solids as well as the solids continuously cleansed from the filter elements will be continuously discharged together from the common tank.

Having thus described my invention what I claim as new and desire to secure by Letters Patent is:—

1. A continuous thickening process consisting, essentially, in submerging a series of hollow filter elements in the mixture being thickened in a common reservoir, continuously removing filtrate from any desired portion of said series of filtering elements, and simultaneously with the removing of said filtrate producing a cleansing action on any other desired portion of said series of filtering elements.

2. A continuous thickening process consisting, essentially, in submerging a series of hollow filter elements in a common reservoir containing the mixture being thickened, continuously removing filtrate from any desired portion of said series of filtering elements, simultaneously with the removing of said filtrate producing a cleansing action on any other desired portion of said series of filtering elements, and continuously withdrawing thickened material from said reservoir.

3. A continuous thickening process consisting, essentially, in submerging a series of hollow filter elements in a common reservoir and continuously removing filtrate from any desired portion of said series of filtering elements simultaneously with the release of diminished pressure on the filtrate side of any other desired portion of said series of filtering elements, thereby utilizing the hydrostatic head of the filtrate in said elements to cleanse said elements.

4. A continuous thickening process consisting, essentially, in submerging a series of hollow filter elements in a common reservoir and continuously removing filtrate from any desired portion of said series of filtering elements simultaneously with the release of diminished pressure and application of additional pressure on the filtrate side of any desired portion of said elements in order to force the filtrate cleansing current back through said elements.

5. A continuous thickening process consisting, essentially, in submerging a series of hollow filter elements in a common reservoir and continuously removing filtrate from any desired portion of said series of filtering elements simultaneously with the release of diminished pressure and application of additional pressure on the filtrate side of any other desired portion of said elements in order to force the filtrate cleansing current back through said elements, and continuously removing thickened material from said reservoir.

6. A continuous thickening process consisting, essentially, in submerging a series of hollow filter elements in a common reservoir and continuously removing filtrate from any desired portion of said series of filtering elements simultaneously with the release of diminished pressure on the filtrate side of any other desired portion of said series of filtering elements, thereby utilizing the hydrostatic head of the filtrate in said elements to cleanse said elements and assisting the filtrate cleansing action by rotating said elements in the mixture being thickened.

7. A continuous thickening process consisting, essentially, in submerging a series of hollow filter elements in a common reservoir and continuously removing filtrate from any desired portion of said series of filtering elements simultaneously with the release of diminished pressure and application of additional pressure on the filtrate side of any other desired portion of said elements in order to force the filtrate cleansing current back through said elements, and assisting the filtrate cleansing action by rotating said elements in the mixture being thickened.

8. A continuous thickening process consisting, essentially, in submerging a series of filter elements in a common reservoir containing a mixture being thickened, and removing filtrate from any desired portion of said series of filtering elements in any desired successive rotation simultaneous with the successive release of diminished pressure on the filtrate side of any other desired portion of said series of filtering elements in order to cleanse these elements.

9. A continuous thickening process consisting, essentially, in submerging a series of filter elements in a common reservoir containing a mixture being thickened, and removing filtrate from any desired portion of said series of filtering elements in any desired rotation simultaneous with the successive release of diminished pressure and application of additional pressure on the filtrate side of any other desired portion of said elements thereby causing a filtrate cleansing current to be forced back through said elements.

10. A continuous thickening process consisting, essentially, in submerging a series of filter elements in a common reservoir containing a mixture being thickened, and removing filtrate from any desired portion of said series of filtering elements in any desired successive rotation simultaneous with the successive release of diminished pressure on the filtrate side of any other desired portion of said series of filtering elements in order to cleanse these elements, and continuously removing thickened material from said reservoir.

11. A continuous thickening process consisting, essentially, in submerging a series of filter elements in a common reservoir containing a mixture being thickened, and removing filtrate from any desired portion of said series of filtering elements in any desired rotation simultaneous with the successive release of diminished pressure and application of additional pressure on the filtrate side of any other desired portion of said elements thereby causing a filtrate cleansing current to be forced back through said elements, and continuously removing thickened material from said reservoir.

In testimony whereof I affix my signature.

ALBERT LEGRAND GENTER.